United States Patent
Blankenship et al.

(10) Patent No.: US 10,721,340 B2
(45) Date of Patent: *Jul. 21, 2020

(54) GUARD PERIOD CONFIGURATION FOR LTE HD-FDD

(71) Applicant: Telefonaktiefolaget L M Ericsson (publ), Stockholm (SE)

(72) Inventors: Yufei Blankenship, Kildeer, IL (US); Johan Bergman, Stockholm (SE); Erik Eriksson, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,101

(22) Filed: Sep. 22, 2016

(65) Prior Publication Data

US 2017/0013095 A1    Jan. 12, 2017

Related U.S. Application Data (63) Continuation of application No. 14/408,262, filed as application No. PCT/SE2014/051268 on Oct. 28, 2014, now Pat. No. 9,480,036.

(Continued)

(51) Int. Cl.
*H04L 29/06*    (2006.01)
*H04W 56/00*    (2009.01)
(Continued)

(52) U.S. Cl.
CPC ............ *H04L 69/22* (2013.01); *H04J 1/00* (2013.01); *H04L 5/16* (2013.01); *H04W 56/005* (2013.01);
(Continued)

(58) Field of Classification Search
None
See application file for complete search history.

(56) References Cited

U.S. PATENT DOCUMENTS 9,480,036 B2 * 10/2016 Blankenship ..... H04W 56/0045
2008/0130625 A1 * 6/2008 Sato ................. H04W 56/0085
370/350
(Continued)

FOREIGN PATENT DOCUMENTS

CN    103535100 A    1/2014
EP    2 093 903 A1    8/2009
(Continued)

OTHER PUBLICATIONS

3GPP, Technical Specification, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0 (Dec. 2012), 108 pp.

(Continued)

*Primary Examiner* — Kouroush Mohebbi
(74) *Attorney, Agent, or Firm* — Sage Patent Group (57) ABSTRACT

The present disclosure relates to a method, a device and a computer program for configuring a guard period in Half Duplex Frequency Division Duplex, HD-FDD, operation. According to some aspects, the disclosure relates to a method, performed in a wireless device, of configuring a guard period in HD-FDD operation. The method comprises obtaining a timing advance between the wireless device and an access point; and determining a guard period in the wireless device based on the obtained timing advance and a radio access capability of the wireless device. The disclosure also relates to a wireless device and to a computer program for executing the methods.

18 Claims, 7 Drawing Sheets

Related U.S. Application Data (60) Provisional application No. 61/990,758, filed on May 9, 2014.

(51) Int. Cl.
    *H04J 1/00*          (2006.01)
    *H04W 72/04*       (2009.01)
    *H04W 74/08*       (2009.01)
    *H04L 5/16*         (2006.01)

(52) U.S. Cl.
    CPC ... *H04W 56/0045* (2013.01); *H04W 72/0406* (2013.01); *H04W 74/0833* (2013.01)

(56) References Cited

U.S. PATENT DOCUMENTS

| | | | |
|---|---|---|---|
| 2010/0085901 A1 | 4/2010 | Womack et al. | |
| 2014/0198773 A1* | 7/2014 | Yin | H04L 5/001 370/336 |
| 2015/0016428 A1* | 1/2015 | Narasimha | H04L 5/0058 370/336 |
| 2016/0254901 A1* | 9/2016 | You | H04J 1/16 370/281 |

FOREIGN PATENT DOCUMENTS

| | | |
|---|---|---|
| GB | 2485387 A | 5/2012 |
| WO | WO 2014/027942 A1 | 2/2014 |

OTHER PUBLICATIONS

3GPP, Technical Specification, "3rd Generation Partnership Project; Technical Specification Group Radio Access Network; Evolved Universal Terrestrial Radio Access (E-UTRA); Physical layer procedures (Release 11)", 3GPP TS 36.213 V11.1.0 (Dec. 2012), 160 pp.

International Search Report and Written Opinion of the International Searching Authority, PCT Application No. PCT/SE2014/051268, Dec. 16, 2014.

Ericsson, "Guard period for low complexity UE in half-duplex FDD", Agenda Item: 6.2.2.2, Document for Discussion and Decision, 3GPP TSG-RAN WG1 Meeting #77, R1-142373, Seoul, Korea, May 19-23, 2014, 6 pp.

Ericsson, "HD-FDD Switching Time for Low Cost MTC UE", Agenda Item: 8.7.3, Document for: Discussion, 3GPP TSG-RAN WG4 Meeting #69, R4-136542, San Francisco, CA, US, Nov. 11-15, 2013, 5 pp.

Ericsson et al., "Half Duplex FDD in LTE", Agenda Item: 6.1.7, Document for: Discussion and Decision, TSG-RAG WG1 #51bis, R1-080534, Sevilla, Spain, Jan. 14-18, 2008, 4 pp.

Motorola, "Observations on HD-FDD Operation", Agenda Item: 6.2.4, Document for: Discussion, 3GPP TSG RAN1#51, R1-074562, Jeju, Korea, Nov. 5-9, 2007, 5 pp.

Written Opinion of the International Preliminary Examining Authority, PCT Application No. PCT/SE2014/051268, dated Apr. 14, 2016.

Chinese Office Action and Search Report dated Mar. 22, 2019 for Chinese Patent Application No. 201480078752.8, 6 pages (includes English translation).

\* cited by examiner

GUARD PERIOD CONFIGURATION FOR LTE HD-FDD

CROSS REFERENCE TO RELATED APPLICATIONS

This application is continuation of U.S. application Ser. No. 14/408,262 filed on Dec. 15, 2014 which application is a 35 U.S.C. § 371 national stage application of PCT International Application No. PCT/SE2014/051268, filed on 28 Oct. 2014, which itself claims priority to U.S. provisional Application No. 61/990,758, filed 9 May 2014, the disclosures and contents of both of which are incorporated by reference herein in their entirety.

TECHNICAL FIELD

The present disclosure relates to a method, a device and a computer program for configuring guard period in Half Duplex Frequency Division Duplex.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE or wireless device, is wirelessly connected to a Radio Base Station, RBS, commonly referred to as a NodeB, NB, in UMTS, and as an evolved NodeB, eNodeB or eNB, in LTE. An RBS is a general term for a radio network node capable of transmitting radio signals to a UE and receiving signals transmitted by a UE.

An important aspect of the communication industry today is the development of Internet of Things. That is, to connect devices, systems and services that goes beyond the traditional machine to machine, M2K, communication. For example, a device like a light post is equipped with communication means so that it can be controlled remotely and so that it can communicate light failure. For it to be possible to equip such devices with communication means and still keep it at a reasonable cost, low cost User Equipments, UEs, are used. However, it has been pointed out that an important issue for low-cost UE operation is half-duplex Frequency Division Duplex, HD-FDD, mode. Low cost UEs should be kept as simple as possible and does therefore only have one oscillator which gives timing problems when switching between uplink and downlink in HD FDD.

Figure 1:
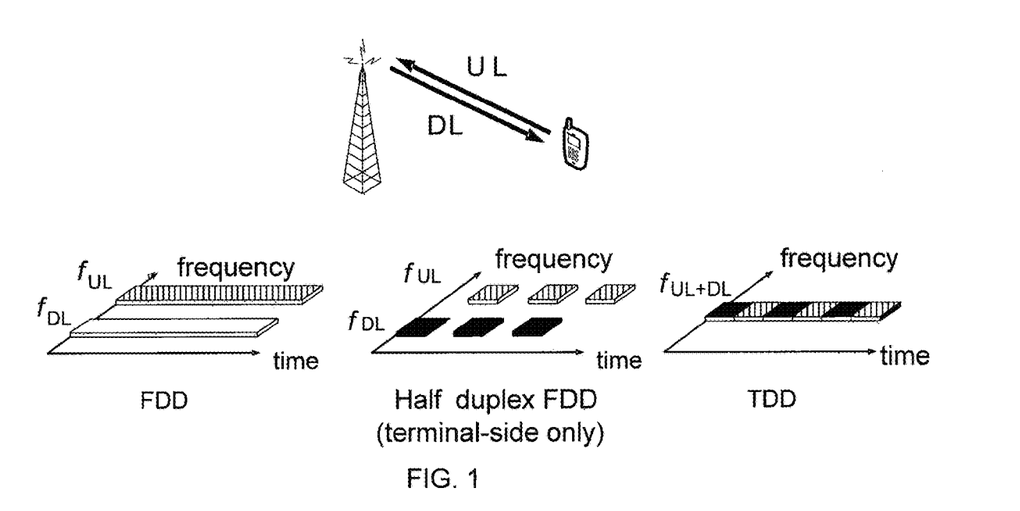
FIG. 1 shows an explanation of frequency- and time-division duplex.

Transmission and reception from a node, e.g. a terminal in a cellular system such as Long Term Evolution, LTE, can be multiplexed in the frequency domain or in the time domain (or combinations thereof). Frequency Division Duplex, FDD, as illustrated to the left in FIG. 1. Further objects, features, and advantages of the present disclosure will appear from the following detailed description, wherein some aspects of the disclosure will be described in more detail with reference to the accompanying drawings, in which:

FIG. 1 implies that downlink and uplink transmission take place in different, sufficiently separated, frequency bands. Time Division Duplex, TDD, as illustrated to the right in FIG. 1. Further objects, features, and advantages of the present disclosure will appear from the following detailed description, wherein some aspects of the disclosure will be described in more detail with reference to the accompanying drawings, in which:

FIG. 1 implies that downlink and uplink transmission take place in different, non-overlapping time slots. Thus, TDD can operate in unpaired spectrum, whereas FDD requires paired spectrum.

Figure 2:
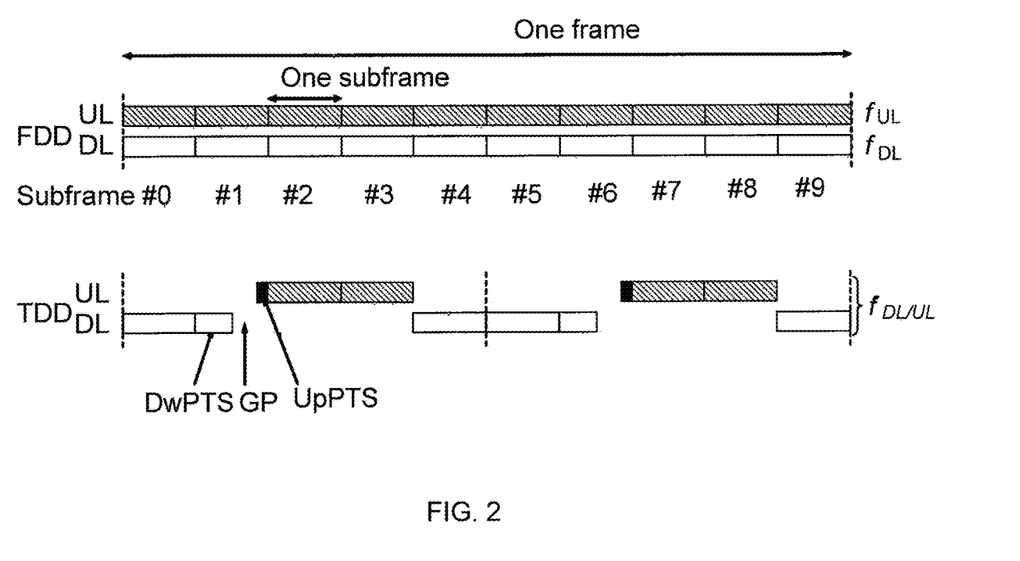
FIG. 2 shows uplink/downlink time/frequency structure for LTE in case of FDD and TDD.

Typically, the structure of the transmitted signal in a communication system is organized in the form of a frame structure. For example, LTE uses ten equally-sized subframes of length 1 ms per radio frame as illustrated in FIG. 2.

In case of FDD operation (upper part of FIG. 2), there are two carrier frequencies, one for uplink transmission, fUL, and one for downlink transmission, fDL. At least with respect to the terminal in a cellular communication system, FDD can be either full duplex or half duplex. In the full duplex case, a terminal can transmit and receive simultaneously, while in half-duplex operation, the terminal cannot transmit and receive simultaneously (the base station is capable of simultaneous reception/transmission though, e.g. receiving from one terminal while simultaneously transmitting to another terminal). In LTE, a half-duplex terminal is monitoring/receiving in the downlink except when explicitly being instructed to transmit in a certain subframe.

In case of TDD operation (lower part of FIG. 2), there is only a single carrier frequency and uplink and downlink transmissions are always separated in time also on a cell basis. As the same carrier frequency is used for uplink and downlink transmission, both the base station and the mobile terminals need to switch from transmission to reception and vice versa. An essential aspect of any TDD system is to provide the possibility for a sufficiently large guard time where neither downlink nor uplink transmissions occur. This is required to avoid interference between uplink and downlink transmissions. For LTE, this guard time is provided by special subframes (subframe 1 and, in some cases, subframe 6), which are split into three parts: a downlink part, DwPTS, a guard period, GP, and an uplink part, UpPTS. The remaining subframes are either allocated to uplink or downlink transmission.

Figure 3:
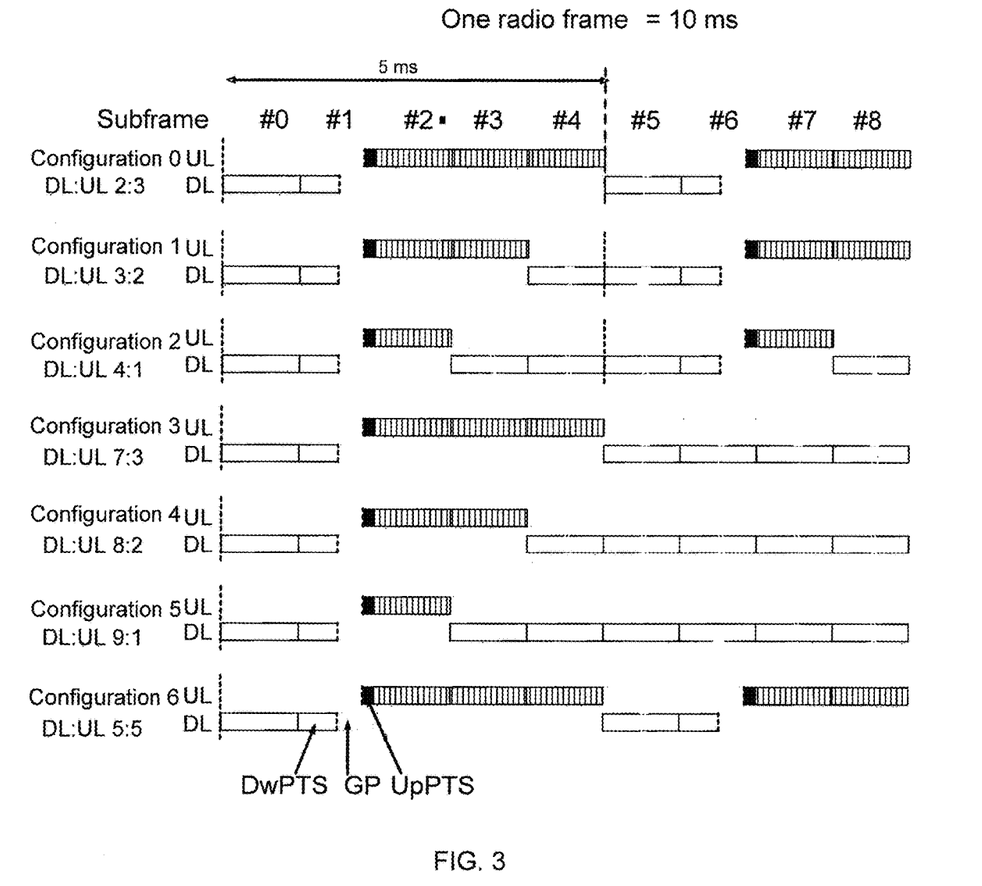
FIG. 3 shows different downlink/uplink configurations in case of TDD.

TDD allows for different asymmetries in terms of the amount of resources allocated for uplink and downlink transmission, respectively, by means of different downlink/uplink configurations. In LTE, there are seven different configurations as shown in FIG. 3. Note that in the description below, DL subframe can mean either DL or the special subframe.

Figure 4:
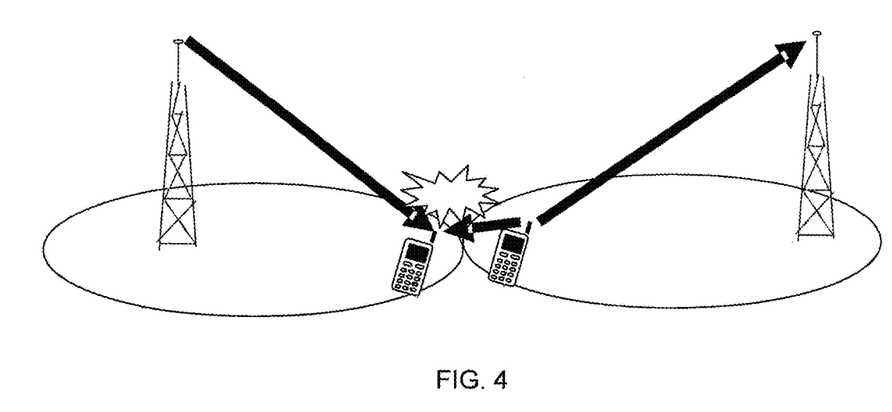
FIG. 4 shows UL-DL interference in TDD.
Figure 5:
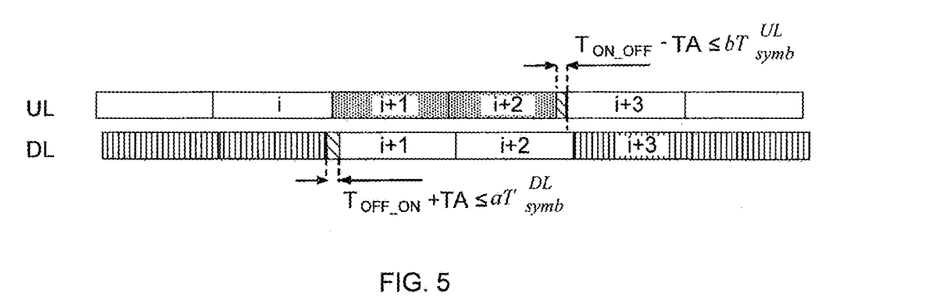
FIG. 5 shows the HD-FDD assumption according to prior art: short radio switch time and sufficiently large TA. All DL subframes are receivable, meaning that only symbols in the DL subframe before the DL-to-UL switch cannot be received, which is considered tolerable.
Figure 6:
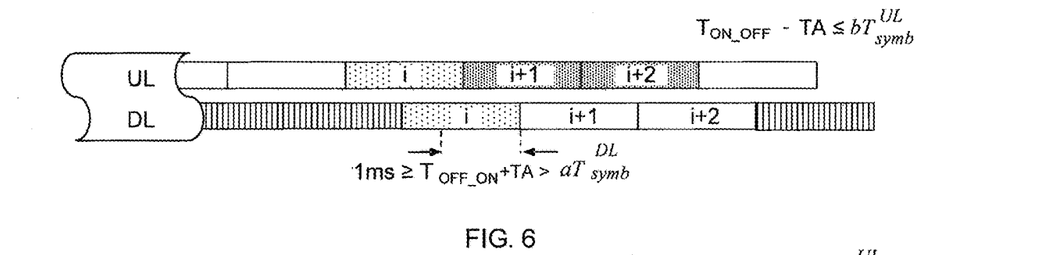
FIG. 6 shows a scenario with short radio switch time, large TA such that one whole DL subframe may not be received.
Figure 7:
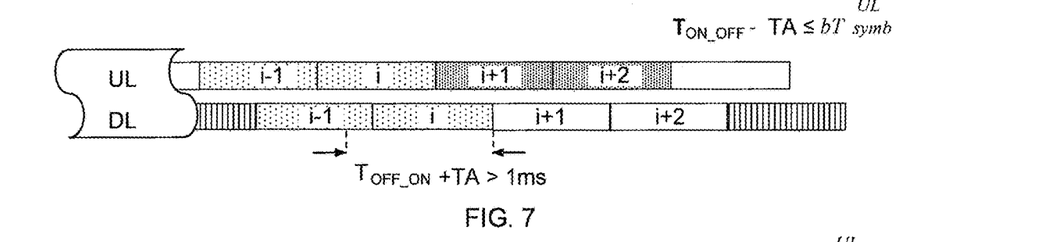
FIG. 7 shows a scenario with long radio switch time, large TA such that two whole DL subframes may not be received.

To avoid severe interference between downlink and uplink transmissions between different cells, neighbor cells should have the same downlink/uplink configuration. If this is not done, uplink transmission in one cell may interfere with downlink transmission in the neighboring cell (and vice versa) as illustrated in FIG. 4. Hence, the downlink/uplink asymmetry can typically not vary between cells, but is signaled as part of the system information and remains fixed for a long period of time.

Currently in the LTE specification, the half-duplex FDD, HD-FDD, mode is not fully specified in terms of guard period.

SUMMARY

An object of the present disclosure is to provide a method, device and computer program to configure a guard period for HD-FDD, and ensure understanding of the configuration in both UE and network, which seeks to mitigate, alleviate, or eliminate one or more of the above-identified deficiencies in the art and disadvantages singly or in any combination.

The disclosure proposes that the guard period is configured in a network node based on timing advance, TA, and radio access capability of a wireless device; the network node being e.g. a wireless device.

The proposed technique relates to a method, performed in a network node, of configuring guard period in Half Duplex Frequency Division Duplex, HD-FDD. According to aspects, the method comprises obtaining a timing advance between a wireless device and an access point and configuring a guard period in the network node based on the obtained timing advance. In other words, the network node configures the guard period based on properties of the radio access capability and/or current connection so that the guard period is tailored to minimize the loss of data during switching from UL to DL and vice versa.

According to some aspects, the guard period is configured using a default timing advance value. In this variant, the radio access capability i.e. the properties of the wireless device are used to configure the guard period. This is a simpler solution, wherein the guard period is known to both the wireless device and the access point without any extra signaling of timing advance.

According to aspects, wherein the guard period is selected from a number of predefined guard period configurations. The guard period configuration is for example selected from a list of guard period configurations. It is an efficient way of selecting the configuration.

According to aspects, the guard period specifies the time duration (e.g., in number of subframes, or fraction of a subframe) which the UE uses for transition from DL-to-UL and/or from UL-to-DL. The eNB takes the guard period into consideration in scheduling DL reception and UL transmission of the given UE.

According to aspects, the method further comprises the step of detecting an event triggering the configuration of guard period. Thus, it is ensured that the configuration is carried out when needed. There are several possible events which can trigger the configuration which are described below.

According to aspects, the event triggering the configuration of guard period is a change in the timing advance that is larger than a predetermined value. When the timing advance is changed more than a predetermined value, it is possible that the guard period is not configured correctly which might lead to lost data, so then the guard period is reconfigured.

According to aspects, the network node is a first network node, and wherein the method further comprises signaling the configured guard period to a second network node. The signaling is done so that both the first and the second network node operate according to the configured guard period.

According to aspects, the method is performed in the wireless device. According to aspects, the step of obtaining the timing advance comprises receiving the timing advance from the access point. According to aspects, the method further comprises the step of sending the radio access capability of the wireless device to the access point.

According to further aspects, the disclosure relates to a computer program comprising computer program code which, when executed in a network node, causes the network node to execute the method according to above.

According to further aspects, the disclosure relates to a network node, configured for configuring guard period in Half Duplex Frequency Division Duplex, HD-FDD, the network node comprising a radio communication interface and processing circuitry configured to cause the network node. The network node is configured to obtain a timing advance between a wireless device and an access point, to obtain radio access capability of the wireless device and to configure a guard period in the network node based on the obtained timing advance and radio access capability.

In other words, the network node comprises a radio communication interface and a processing circuitry for configuring the guard period based on properties of the current connection so that the guard period is tailored to minimize the loss of data during switching from UL to DL and vice versa.

According to aspects, the network node is the wireless device. According to aspects, the step of obtaining comprises receiving the timing advance from the access point.

According to aspects, the processing circuitry is further adapted to send the radio access capability of the wireless device to the access point.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The device, method and computer program disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The term access point, as used in the disclosure, is used for the hardware that is connected to the mobile communications network that communicates directly with communication devices, i.e. a base station. An example of an access point is an evolved Node B, eNB; a base station in LTE. In other words, an access point is typically a base station, e.g. an eNB. The terms wireless device, UE and communication device are user interchangeable throughout the disclosure. The term radio access capability is a term used for the connection properties of the wireless device. The properties can be both hardware properties and what kind of connections the wireless device supports. Thus, the term describes how fast a wireless device can switch from DL-to-UL and UL-to-DL and is interchangeable with "UE capability", "radio capability", "UE radio access capability".

The method, device and computer program according to the present disclosure allow the wireless device to fully utilize the possible uplink and downlink subframes in HD-FDD operation and enable the network to avoid scheduling subframes to HD-FDD wireless devices that are unable to receive them.

Guard Period for HD-FDD

In the following, it is assumed that it is sometimes acceptable for the UE to skip transmitting the b last Single-Carrier Frequency-Division Multiple Access, SC-FDMA, symbols in an uplink, UL, subframe in order to allow enough UL-to-DL switching time in the UE, and it is acceptable for the UE to skip receiving a Orthogonal Frequency-Division Multiplexing, OFDM, symbols in a downlink, DL, subframe in order to allow enough DL-to-UL switching time in the UE. Without losing generality, it is also assumed that $T_{OFF\_ON} \approx T_{ON\_OFF}$ where $T_{OFF\_ON}$ is the OFF-to-ON switching time for the UE transceiver and $T_{ON\_OFF}$ is the ON-to-OFF switching time for the UE transceiver. Also $T_{OFF\_ON}$ and $T_{ON\_OFF}$ are also referred to as radio switching time, to distinguish from other time intervals in the system such as the time interval reserved in a subframe (or subframes) for switching purpose, which may not be equal to the actual radio switch time of the UE transceiver.

Note that for UL in order to allow to skip transmitting b, b>0, last SC-FDMA symbols in a UL subframe, the Physical Uplink Control Channel, PUCCH, format may need to be modified (similar to what's done when a Sounding Reference Signal, SRS, is inserted) in the specification. Otherwise the properties of PUCCH are destroyed and it cannot be received properly. If no SC-FDMA symbol can be skipped in an UL subframe, then b=0 in the figures below.

For the downlink, a reasonable value is a<=2. Otherwise if a>=3, then at least one column of Cell Specific Reference signal, CRS, symbols will be lost, which is not desirable for demodulation and decoding at the UE.

There are five cases possible, considering the various combinations of:

The switching time $T_{OFF\_ON}$ and $T_{ON\_OFF}$ for a given UE. This largely depends on the UE implementation, for example, if one or two oscillators are used in the UE.

Timing advance (TA). In the cellular mobile phone standard, timing advance value corresponds to the length of time a signal takes to reach the base station from a mobile phone. This depends on the propagation time, which is in turn a function of the distance between UE and access point. In general, TA is set to be twice the propagation time.

Subframe timing for UL and DL of the five cases are depicted in FIG. 5 to FIG. 9. These figures are drawn from the perspective of UE, where the UL subframe is ahead of the DL subframes by TA amount of time.

Figure 15:
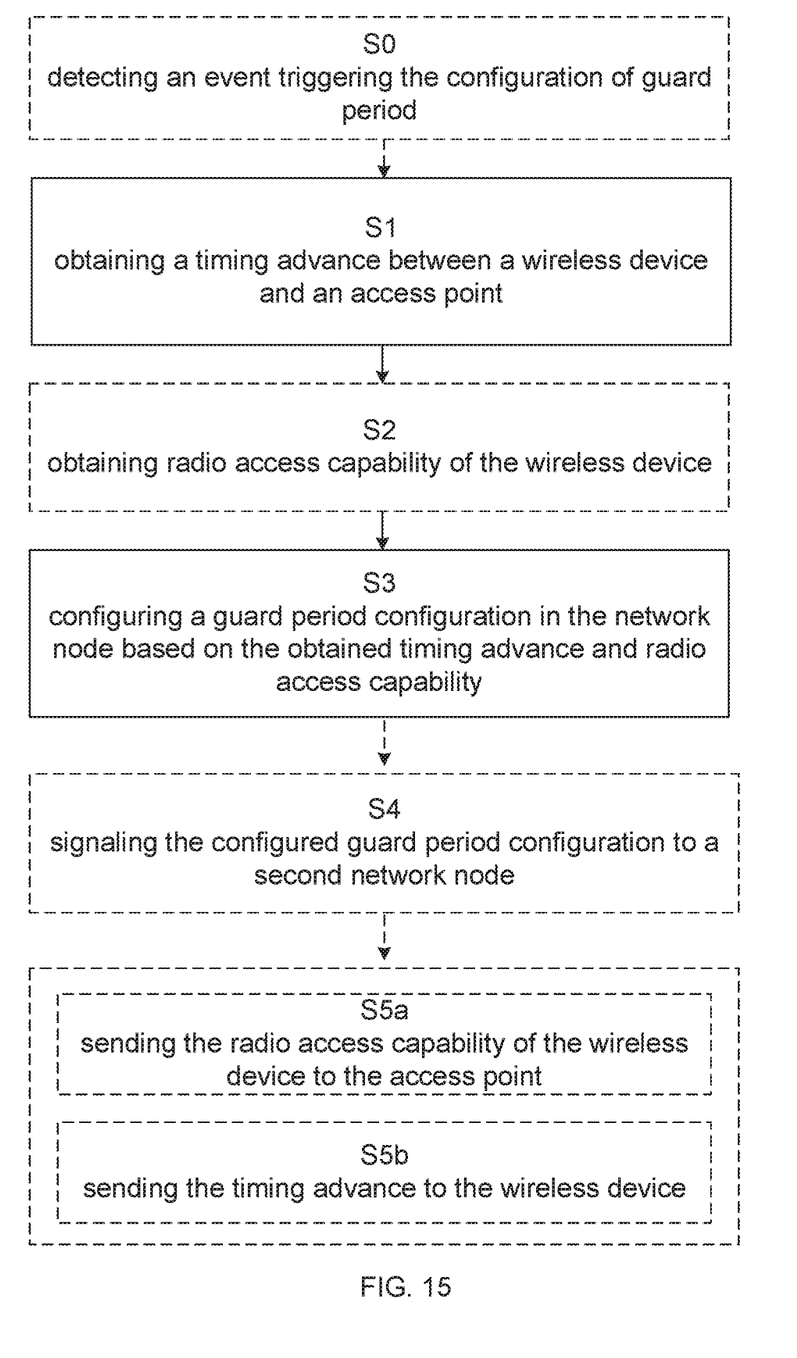
FIG. 15 shows steps of a method performed in a network node.

FIG. 15 shows the HD-FDD assumption according to prior art: short radio switch time and sufficiently large TA. All DL subframes are receivable, meaning that only symbols in the DL subframe before the DL-to-UL switch cannot be received, which is considered tolerable.

Figure 16:
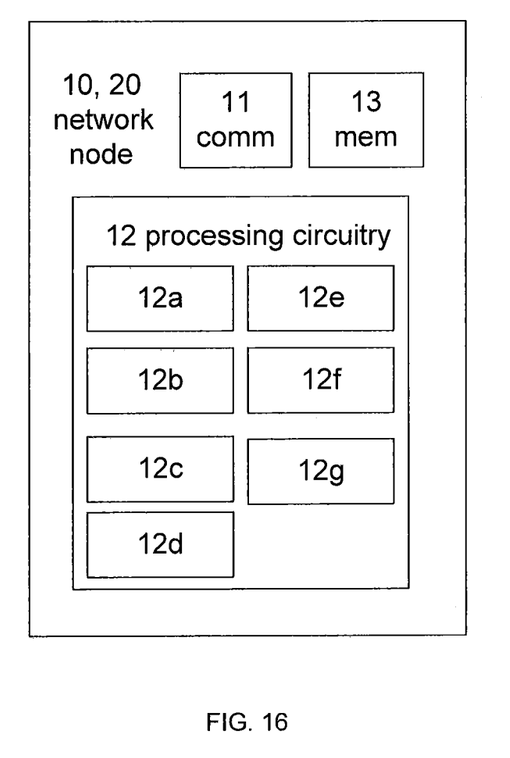
FIG. 16 shows a network node according to aspects of the disclosure.

FIG. 16 shows a scenario with short radio switch time, large TA such that one whole DL subframe may not be received.

Figure 17:
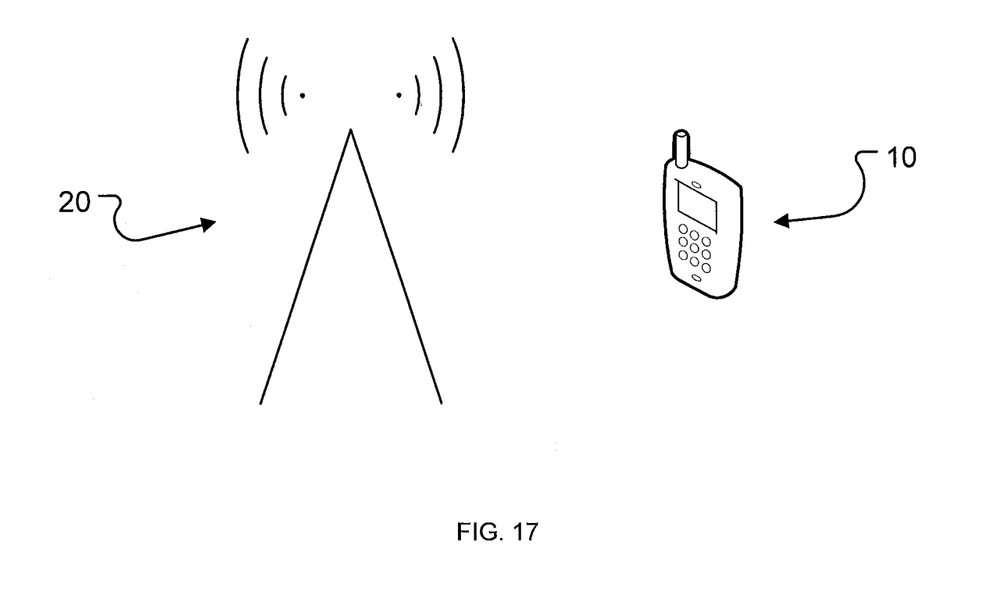
FIG. 17 shows a wireless device and an access point.

FIG. 17 shows a scenario with long radio switch time, large TA such that two whole DL subframes may not be received.

Figure 8:
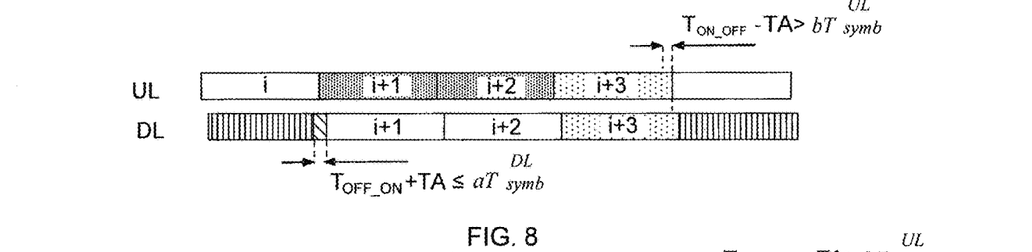
FIG. 8 shows a scenario with short-to-medium radio switch time, close-to-zero TA such that more than b SC-FDMA symbol has to be skipped for ON-to-OFF switching, causing one UL subframe to may not be received.
Figure 9:
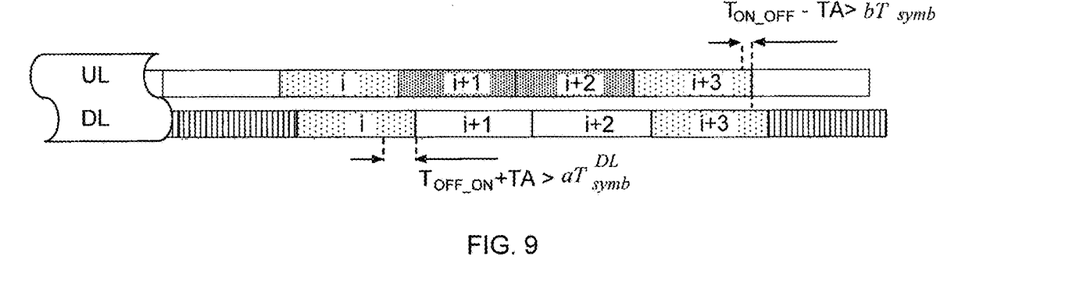
FIG. 9 shows a scenario with medium-to-large radio switch time, medium TA such that one UL subframe may not be worth transmitting, and one DL subframe may not be received.
Figure 10:
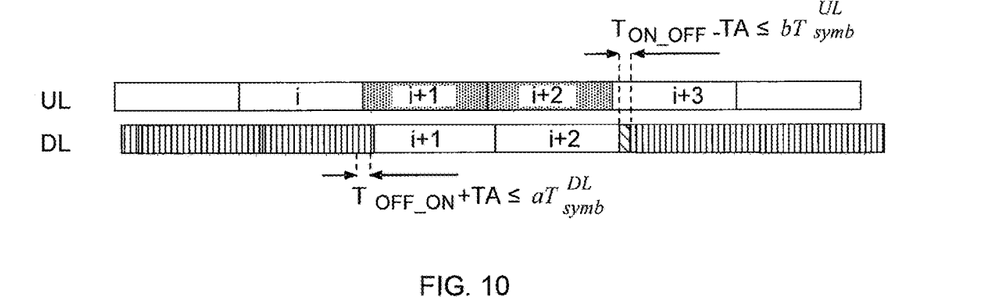
FIG. 10 shows a scenario with short radio switch time and sufficiently large TA. All DL subframes are receivable, even though none (or a small fraction of the beginning of the DL subframe) may not be received during UL-to-DL switching, and a small fraction of the end of a DL subframe may not be received during DL-to-UL switching.
Figure 11:
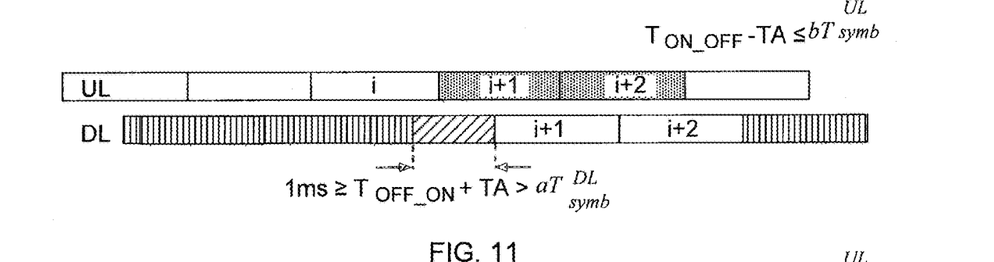
FIG. 11 shows a scenario with short radio switch time, large TA such that the data region of the DL subframe during DL-to-UL switching may not be received.
Figure 12:
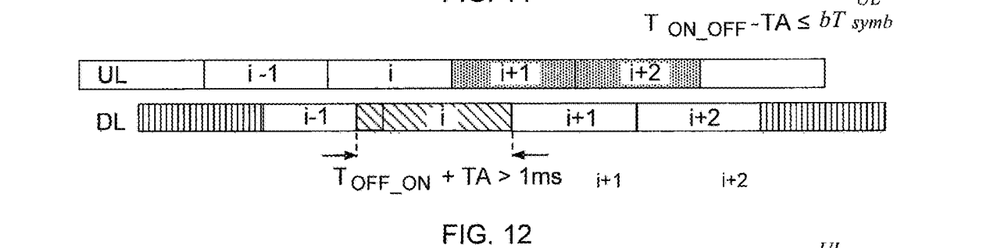
FIG. 12 shows a scenario with long radio switch time, large TA such that {one whole DL subframe, a fraction of the data region of a consecutive DL subframe} during DL-to-UL switching may not be received.
Figure 13:
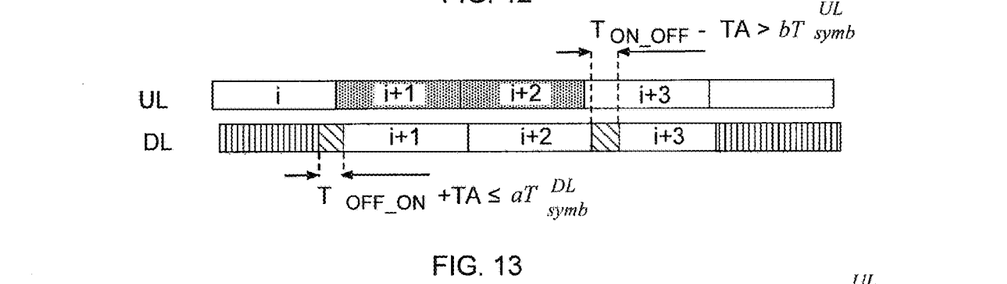
FIG. 13 shows a scenario with short-to-medium radio switch time, close-to-zero TA such that control region during UL-to-DL switching is not receivable, and a fraction of data region of the DL subframe during DL-to-UL switching may not be received.
Figure 14:
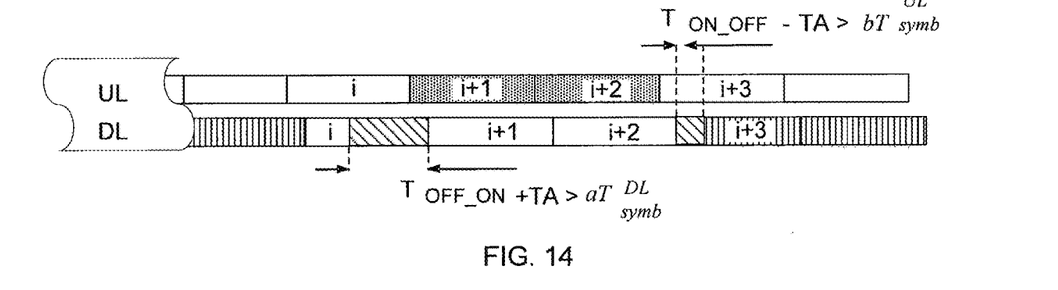
FIG. 14 shows a scenario with medium-to-large radio switch time, medium TA such that control region during UL-to-DL switching may not be received, and the data region of the DL subframe during DL-to-UL switching may not be received.
Figure 18:
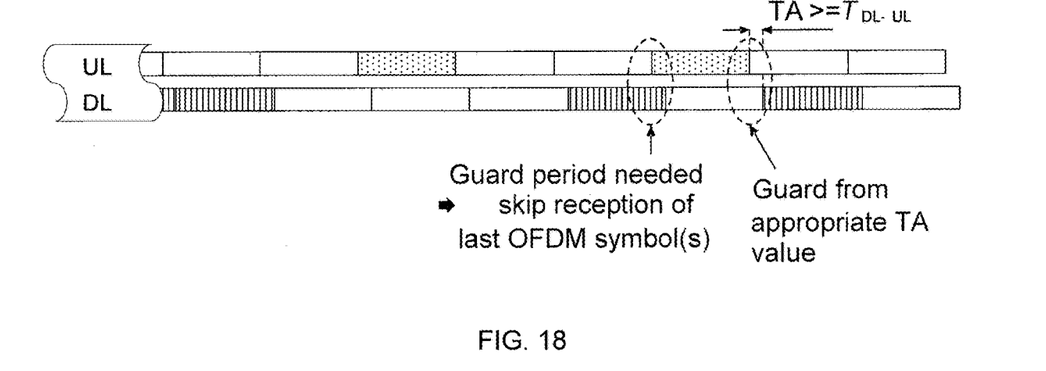
FIG. 18 shows the assumption of HD-FDD timing according to prior art.

FIG. 18 shows a scenario with short-to-medium radio switch time, close-to-zero TA such that more than b SC-FDMA symbol has to be skipped for ON-to-OFF switching, causing one UL subframe to may not be received. Note that FIG. 8 depicts a scenario that's not taken care of in the current disclosure, even when the low-cost UE type introduced in LTE Release 12 is not considered.

Figure 19:
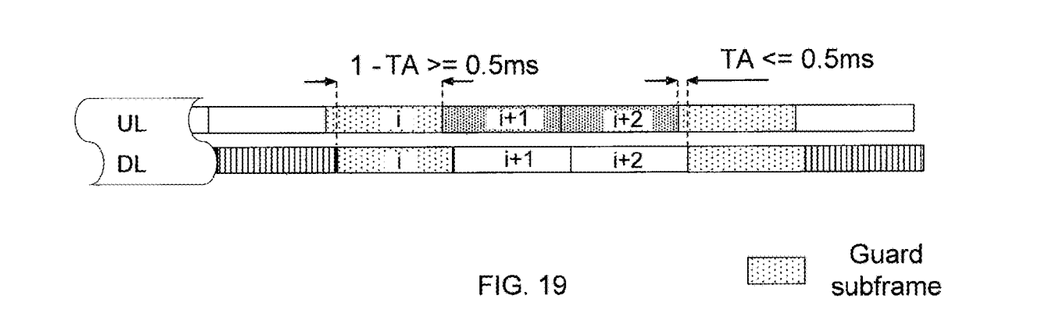
FIG. 19 shows the guard periods of low-cost UE when TA≤0.5 ms.

FIG. 19 shows a scenario with medium-to-large radio switch time, medium TA such that one UL subframe may not be worth transmitting, and one DL subframe may not be received.

Considering the various guard period timings, there may be a need to exchange information between UE and access point about it, so that this can be correctly handled in the scheduler in the access point. The UE radio access capability (i.e., ON-to-OFF and OFF-to-ON switching time) is static information, while the timing advance (TA) may vary in time, depending on the mobility of the UE. In general, the TA can be treated as semi-statically varying. To share the guard period arrangement information between access point and UE, which is a function of {UE radio access capability, timing advance}, proper signaling is necessary.

There are several options to achieve this:

The UE radio access capability and the TA information are exchanged between access point and UE separately. The UE radio access capability is signaled from UE to access point, where the UE can indicate its switching time from a set of possible of switching time periods. The TA is signaled from access point to UE during the random access procedure. With these two pieces of information shared, the UE and the access point each individually derive the guard period configuration from a set of predefined configurations.

After receiving the TA information from access point during the random access procedure or receiving a timing advance Medium Access Control, MAC, control element, the UE derives its guard period configuration and signals the derived configuration to the access point. According to one embodiment the signaling is omitted if the same guard period configuration as previous is derived.

The access point derives the guard period after receiving the UE radio access capability from the UE and signals the derived configuration to the UE.

Note that in some cases a default TA value may be used without explicit signaling of TA from access point, in which case the guard period is derived using the default TA value. Such a default value may e.g. be defined in a standard, or it may be hardware specific, or associated with a particular UE category. This variant implies that the guard period is basically configured based on the radio access capability.

For the procedure to function properly there is a need to define a set of guard period configurations in the specification. One example of the guard period configurations is shown in Table 1 below, where the guard period configuration indices correspond to the illustrations in FIG. 5 to FIG. 9. Here 'D' denotes a downlink subframe, 'U' denotes an uplink subframe, 'G' denotes a guard subframe.

TABLE 1

List of guard period configurations

| Guard period configuration index | Guard period configuration | Subframes for DL-to-UL | Subframes for UL-to-DL |
|---|---|---|---|
| 1 | DTX in last one or more OFDM symbols in the DL subframe prior to UL transmission | [D U] | [U D] |
| 2 | One subframe for guard period | [D G U] | [U D] |
| 3 | Two subframes for guard period | [D G G U] | [U D] |
| 4 | One subframe, and DTX in last one or more OFDM symbols in the DL subframe prior to UL transmission | [D U] | [U G D] |
| 5 | Two subframes for guard period | [D G U] | [U G D] |

In the following, it is assumed that it may acceptable for the UE to skip transmitting b first Orthogonal Frequency-Division Multiple Access, OFDMA, symbols in a DL subframe in order to allow enough UL-to-DL switching time in the UE, and it is acceptable for the UE to skip receiving a OFDM symbols in a DL subframe in order to allow enough DL-to-UL switching time in the UE. This is referred to as Discontinuous Transmission, DTX. Without losing generality, it is also assumed that $T_{OFF\_ON} \approx T_{ON\_OFF}$ where $T_{OFF\_ON}$ is the OFF-to-ON switching time for the UE transceiver and $T_{ON\_OFF}$ is the ON-to-OFF switching time for the UE transceiver.

The five scenarios are illustrated in FIG. 20-FIG. 24. Correspondingly the guard period configuration can be defined using Table 2.

Note that when skipping part of a DL subframe for guard period, the eNB may arrange to not totally waste the DL subframe using special arrangements. For example, when the data region (or a large fraction of it) is not receivable, data payload (Physical Downlink Shared Channel, PDSCH) is not receivable, but information in the control region (e.g., Physical Downlink Control Channel, PDCCH, Physical Hybrid automatic repeat request Indicator Channel, PHICH, Physical Control Format Indicator Channel, PCFICH) is still receivable. In another example, when a fraction of the beginning of the DL subframe (e.g., the control region) is not receivable, the eNB can arrange that control channel information is conveyed via ePDCCH, and/or the data payload is scheduled using Semi-Persistent Scheduling, SPS, so that no control information is necessary in the same subframe.

TABLE 2

List of guard period configurations

| Guard period configuration index | Guard period configuration | Subframes for DL-to-UL | Subframes for UL-to-DL |
|---|---|---|---|
| 1 | A fraction of the data region of the DL subframe prior to UL transmission | [$D_{no-dataata,frac}$ U] | [U D] |
| 2 | Data region of one DL subframe for guard period | [$D_{no-data}$ U] | [U D] |
| 3 | One whole of a first DL subframe, and a fraction of data region of a consecutive DL subframe | [$D_{no-dataata,frac}$ G U] | [U D] |
| 4 | A small fraction of data region of a first DL subframe, and control region of a second DL subframe | [$D_{no-dataata,frac}$ U] | [U $D_{no-control}$] |
| 5 | Data region of a first DL subframe, and control region of a second DL subframe | [$D_{no-dataata}$ U] | [U $D_{no-control}$] |

Figure 20:
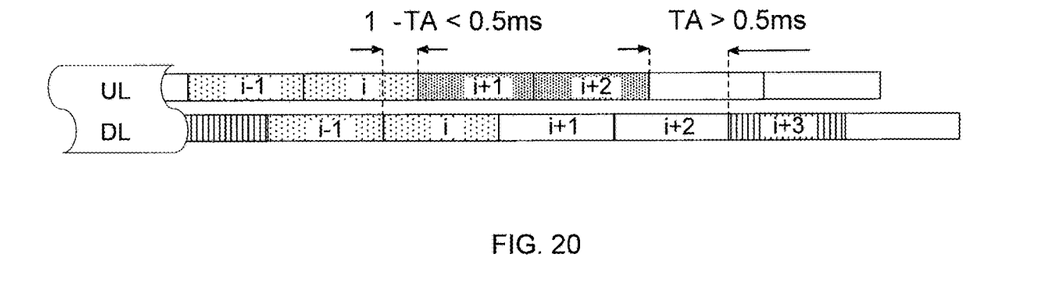
FIG. 20 shows the guard periods of low-cost UE when TA>0.5 ms.

FIG. 20 shows a scenario with short radio switch time and sufficiently large TA. All DL subframes are receivable, even though none (or a small fraction of the beginning of the DL subframe) may not be received during UL-to-DL switching, and a small fraction of the end of a DL subframe may not be received during DL-to-UL switching.

FIG. 21 shows a scenario with short radio switch time, large TA such that the data region of the DL subframe during DL-to-UL switching may not be received.

FIG. 22 shows a scenario with long radio switch time, large TA such that {one whole DL subframe, a fraction of the data region of a consecutive DL subframe} during DL-to-UL switching may not be received.

FIG. 23 shows a scenario with short-to-medium radio switch time, close-to-zero TA such that control region during UL-to-DL switching is not receivable, and a fraction of data region of the DL subframe during DL-to-UL switching may not be received.

FIG. 24 shows a scenario with medium-to-large radio switch time, medium TA such that control region during UL-to-DL switching may not be received, and the data region of the DL subframe during DL-to-UL switching may not be received.

FIG. 15 illustrates the steps in a method, performed in a network node 10, 20, of configuring guard period in Half Duplex Frequency Division Duplex, HD-FDD. The network node 10, 20 is illustrated in FIG. 16. The configuration of guard period is for example performed when a wireless device switches from using one access point in a network to another or the first time a wireless device is powered on and connects to an access point in a network.

According to aspects, the method comprises obtaining S1 a timing advance between a wireless device and an access point. Timing advance may be a default value given or assumed in a standard, or it may be estimated based on the hardware, or associated with a given UE category. The step is performed in an obtainer of timing advance 12a of a processing circuitry 12 of the network node.

According to some aspects, the method further comprises obtaining S2 radio access capability of the wireless device. If the method is performed in a wireless device, the radio access capability is already available in the wireless device. Then, the step of obtaining S2 implies e.g. retrieving the radio access capability from a register or from a memory or by reading a variable. If the method is performed in an access point, then this step implies receiving the radio access capability from the wireless device. The step is performed in an obtainer of radio access capability 12b of the processing circuitry 12 of the network node.

The method further comprises configuring S3 a guard period in the network node based on the obtained timing advance and radio access capability. The step is performed in a configurer 12c of the processing circuitry 12 of the network node. The guard period specifies the time duration in unit of subframes, or fractions of subframes, that it is acceptable for the wireless device to skip receiving at transition from DL-to-UL and/or to skip transmitting at transition from UL-to-DL. Hence, the guard period specifies a time duration during which the wireless device is allowed to not receive downlink transmission or a time duration during which the wireless device is allowed to not transmit uplink signal.

In other words, the network node configures the guard period based on properties of the current connection so that the guard period is tailored to minimize the loss of data during switching from UL to DL and vice versa. The network node is either the wireless device or the access point. The radio access capability is typically the UE radio access capability of the wireless device. A guard period is defining the number of subframes used for transition from DL-to-UL and from UL-to-DL. The guard period is an integer number of subframes or a fractional amount of a subframe.

According to aspects, the guard period configuration is selected from a number of predefined guard period configurations. The predefined configurations are e.g. listed in a table as shown in table 1. As seen in the table, the guard period configuration specifies the number of subframes used for transition from DL-to-UL and/or from UL-to-DL. If a default timing advance is used, then the guard period may be configured to be e.g. one or two sub frames, or a fraction of a subframe, depending on the radio access capability.

The guard period configuration is for example selected from a table of guard period configurations which is an efficient way of selecting the configuration. According to aspects, the network node uses the timing advance and the radio access capability as parameters to select a suitable configuration in the table. The number if subframes in the guard period ensure that no important data is lost in the transition from DL-to-UL and/or from UL-to-DL.

In some embodiments the configuration may also consist of a Guard-subframe configuration, included in the same table or signaled separately. In some embodiments a guard-subframe configuration consists of the number of receivable DL OFDM symbols in the DL subframe immediately before DL-to-UL switching, and transmittable UL symbols in the UL subframe immediately before UL-to-DL switching. In other embodiments the guard-subframe configuration indicates if the downlink control channels PDCCH and/or PHICH can be received or not in the DL subframe immediately before the DL-to-UL switching, so that access point and UE have the correct mutual understanding if the UE can still detect the PDCCH and/or PHICH information even if the PDSCH transmission is not usable.

According to aspects, the method steps of FIG. 15 further comprises the step of detecting S0 an event triggering the configuration of guard period. The step is performed in a detector 12d of the processing circuitry 12 of the network node. Thus, it is ensured that the configuration is carried out when needed. There are several possible events which can trigger the configuration. In other words, the configuration is triggered at an event, for example connection setup or at other events. An example of an event is when the wireless device first attaches to an access point, in other words, during initial connection between the wireless device and the access point.

According to aspects, the event triggering the configuration of guard period is a change in the timing advance that is larger than a predetermined value. When the timing advance is changed more than a predetermined value, it is possible that the guard period is not configured correctly which might lead to lost data, so then the guard period is reconfigured. In other words, if the wireless device is unable to fulfil the configuration, i.e. the timing advance is larger than a predetermined value, if $TA>T_{ON\text{-}OFF}$, the configuration of guard period is triggered. According to one aspect the event triggering the configuration of guard period is a change in the timing advance that is smaller than a predetermined value. In other words, the event is for example if the TA changes to above a threshold value or below a threshold value.

According to aspects, the network node is a first network node, and wherein the method further comprises signaling S4 the configured guard period to a second network node. The step is performed in a signaler 12e of the processing circuitry 12 of the network node. The signaling is done so that both the first and the second network node operate according to the configured guard period. In the case when the first network node is a wireless device, the wireless device signals the configured guard period to the access point, i.e. the second network node. In the case when the first network node is a access point, the access point signals the configured guard period to the wireless device, i.e. the second network node.

FIG. 17 shows two examples of a network node. One example is an access point and one is a wireless device. According to aspects, the network node is the wireless device 10 and the step of obtaining comprises receiving the timing advance from the access point 20. According to aspects, the method is performed in the wireless device 10 of FIG. 17. In other words, the network node is a wireless device.

According to aspects, the step of obtaining the timing advance comprises receiving the timing advance from the access point 20. When the wireless device is the one to configure the guard period, the access point sends timing advance information to the wireless device.

According to aspects, the method further comprises the step of sending S5a the radio access capability of the wireless device to the access point 20. The step is performed in a first sender 12f of the processing circuitry 12 of the network node.

When the network node is the wireless device 10, the guard period is in one example configured only in the wireless device and signaled to the access point. Alternatively it is configured in both the wireless device and the access point by individual determination according to pre-determined algorithm/rules. When the guard period is configured individually, the wireless device sends its radio access capability to the access point.

According to aspects, the method is performed in the access point 20. In other words, the network node is an access point.

According to aspects, the step of obtaining the radio access capability of the wireless device comprises receiving the radio access capability from the wireless device 10. When the access point is to configure the guard period, the access point receives the radio access capability of the wireless device from the wireless device. According to aspects, the radio access capability is received during a UE capability transfer e.g. a random access procedure.

In one embodiment of the invention the configuration is set from a formula using the UE capability and the TA value contained in the Random Access Response. If the UE is unable to fulfil the configuration, e.g. if TA has changed, it triggers a new random access procedure. According to aspects, if the network wants to update the configuration a PDCCH ordered RACH is performed.

According to another variation, when the network node is an access point, the method further comprises sending S5b the timing advance to the wireless device. The step is performed in a second sender 12g of the processing circuitry 12 of the network node.

Timing Advance is typically estimated in the access point. By sending the timing advance the wireless device is enabled to individually configure the guard period. When the network node is the access point 20 the guard period is in one example configured only in the access point and signaled to the wireless device. Alternatively it is configured in both the wireless device and the access point by individual determination according to predetermined algorithm/rules.

According to further aspects, the disclosure relates to a computer program comprising computer program code which, when executed in a network node 10, 20, causes the network node to execute the method according to above. The computer program instructions are for example stored in a computer-readable memory 13.

An example embodiment of a network node 10,20 is shown in FIG. 16. According to further aspects, the network node 10, 20 is configured for configuring a guard period in Half Duplex Frequency Division Duplex, HD-FDD. The network node comprises a radio communication interface 11 and a processing circuitry 12. The processing circuitry 12 is configured to cause the network node to obtain S1 a timing advance between a wireless device and an access point to obtain S2 radio access capability of the wireless device; and to configure S3 a guard period in the network node based on the obtained timing advance and radio access capability.

In other words, the network node comprises a radio communication interface and a processing circuitry for configuring the guard period based on properties of the current connection so that the guard period is tailored to minimize the loss of data during switching from UL to DL and vice versa.

According to aspects, the network node 10, 20 of example embodiments 16 or 17, wherein the processing circuitry is further adapted to send the radio access capability of the wireless device to the access point 20.

When the network node is the wireless device the guard period in one example configured only in the wireless device and signaled to the network node. Alternatively it is configured both the wireless device and the access point by individual determination according to a predetermined algorithm/rules. When the guard period is configured individually, the wireless device sends its radio access capability to the access point.

The other example of FIG. 17 shows, according to aspects, that the network node is an access point 20. As previously described in the disclosure, according to aspects, the radio access capability of the wireless device comprises receiving the radio access capability from the wireless device 10, according to aspects, the radio access capability is received during a random access procedure and according to aspects, the processing circuitry is further adapted to send the timing advance to the wireless device. Furthermore, according to aspects, the processing circuitry 12 is configured to detect S0 an event triggering the configuration of guard period and according to aspects, the processing circuitry 12 is further configured to signal S4 the configured guard period to a second network node.

Low-Cost UE in HD-FDD Mode

Current definition (Rel-8 HD-FDD) assumes small switching time 1 μs to 50 μs (<1 OFDM symbol; for example for cells between 100 m and 7.5 km), and small but not-close-to-zero TA (TA>=20 μs). Switching time for the downlink-to-uplink transition is created by allowing the UE to DRX the last OFDM symbols in a downlink subframe immediately preceding an uplink subframe. Switching time for the uplink-to-downlink transition is handled by setting the appropriate amount of timing advance in the UE. This is illustrated in FIG. 18. The same adjustment of the uplink timing from the access point perspective is also applied to full duplex UEs.

As stated in the reply LS from RAN4 to RAN1 (R4-141235):

For low complexity HD-FDD MTC UE, the Rx-to-Tx switching time is up to 1 ms if single oscillator is used For low complexity HD-FDD MTC UE, the Tx-to-Rx switching time is up to 1 ms if single oscillator is used While most cells have a range less than 75 km (thus TA less than 500 μs), an LTE cell can have a range up to 100 km and require a TA up to 667 μs.

For FDD frame structure, transmission of the uplink radio frame number i from the UE shall start $(N_{TA}+N_{TA\ offset})\times T_s$ seconds before the start of the corresponding downlink radio frame at the UE, where $0 \leq N_{TA} \leq 20512$, $N_{TA\ offset}=0$ for frame structure type 1 (FDD). Here the maximum value NTA=20152 corresponds to the RTT of 20512/(15000× 2048) (seconds)=667 μs.

Guard Period for Low-Cost UE in HD-FDD Mode

The diagram below illustrates the UL and DL subframe timing from the perspective of the low-cost UE. In the analysis below it is assumed that the low-cost UE needs 0.5 ms for ON-to-OFF switching time, and also 0.5 ms for OFF-to-ON switching time, i.e., $T_{OFF\_ON}=T_{ON\_OFF}=0.5$ ms.

When TA≤0.5 ms, the TA is not sufficient for the ON-to-OFF switching time, thus there is a need to put 1 ms of guard period to switch from UL to DL (FIG. 19).

When 0.667 ms>TA>0.5 ms, the TA is sufficient for the ON-to-OFF switching time. But (1-TA) is not sufficient for OFF-to-ON switching time, thus there is a need to put 2 ms (i.e., 2 subframes) of guard period to switch from DL to UL (FIG. 20).

Thus for low-cost UE, the guard period configurations is shown in the 3 below. Guard period configuration indices correspond to the illustrations in FIG. 19 and FIG. 20. Note that the configuration indices 1 and 2 in 3 correspond to configuration indices 3 and 5 in Table 1.

TABLE 3

List of guard period configurations for low-cost UE

| Guard period configuration index | Guard period configuration | Subframes for DL-to-UL | Subframes for UL-to-DL |
|---|---|---|---|
| 1 | Two subframes for guard period | [D G G U] | [U D] |
| 2 | Two subframes for guard period | [D G U] | [U G D] |

It has here been assumed that $T_{OFF\_ON}=T_{ON\_OFF}=0.5$ ms for a low cost UE but that is not always the case. As previously discussed the radio access capability of the UE depends on the number of oscillators in the device. It is left up to the implementation how many oscillators the low cost UE has. The network cannot make any assumptions regarding the number of oscillators or the radio access capability of the UE. Thus signaling is used to calculate the needed switching time.

UE Guard Period Reporting

The guard period can be configured from the network or derived in the UE.

For the case where the guard period is configured from the network the access point send a configuration message to the UE indicating a guard period. In this option signaling support from the UE can aid the network. In one embodiment the UE will trigger a report to the access point if it receives a TA command such that the time constraint of the UE falls below a threshold, where the threshold is configured from the network or fixed in the standard. In some embodiments the UE may report a preferred configuration. The UE can also report the processing time required for switching in its transceiver, where this can be done by explicit signaling or tied to a capability or UE category or class.

In the case the configuration is derived in the UE, the UE may signal the selected configuration to the network. In other embodiments the access point may blindly detect the configuration applied in the UE by DTX detection and/or HARQ statistics.

In one embodiment of the invention the configuration is set from a formula using the UE capability and the TA value contained in the Random Access Response. If the UE is unable to fulfil the configuration, e.g. if TA has changed, it triggers a new random access procedure. If the network wants to update the configuration a PDCCH ordered RACH can be performed.

In some implementations and according to some aspects of the disclosure, the functions or steps noted in the blocks of FIG. 15 can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The invention claimed is:

1. A method, performed in a user equipment, the method comprising:
   configuring a guard period in Half Duplex Frequency Division Duplex (HD-FDD) operation;
   detecting a timing advance between the user equipment and an access point has changed by a value that is larger than a predetermined non-zero value; and
   responsive to detecting the timing advance has changed by a value that is larger than the predetermined non-zero value, determining the guard period in the user equipment based on an amount of the detected change in the timing advance and a radio access capability of the user equipment.

2. The method of claim 1, wherein the guard period is configured using a default timing advance.

3. The method of claim 2, wherein the guard period configured using the default timing advance is 1 or 2 subframes.

4. The method of claim 1, wherein the guard period specifies a time duration in unit of subframes, or a fractional amount of a subframe, that it is acceptable for the user equipment to skip receiving at transition from downlink (DL)-to-uplink (UL) transmissions.

5. The method of claim 1, wherein the guard period specifies a time duration in unit of subframes, or a fractional amount of a subframe, that it is acceptable for the user equipment skip transmitting at transition from uplink (UL)-to-downlink (DL) transmissions.

6. The method of claim 1, wherein the method further comprises:
   obtaining the radio access capability of the user equipment.

7. The method of claim 1, wherein the radio access capability is associated with a user equipment (UE) category.

8. The method of claim 7, wherein the radio access capability is sent during a random access procedure.

9. The method of claim 1, further comprising:
   sending the radio access capability of the user equipment to the access point.

10. The user equipment of claim 1, wherein the radio access capability of the user equipment depends on a number of oscillators of a transceiver in the user equipment.

11. The user equipment of claim 10, wherein the radio access capability of the user equipment identifies the transceiver of the user equipment comprises a single oscillator.

12. The method of claim 1, wherein the radio access capability of the user equipment comprises a radio switching time of a transceiver of the user equipment.

13. The method of claim 12, wherein the radio switching time of the transceiver of the user equipment comprises a time for the transceiver to switch from ON-to-OFF and a time for the transceiver to switch from OFF-to-ON.

14. The method of claim 12, wherein determining the guard period in the user equipment based on the obtained timing advance and a radio access capability of the user equipment comprises:
   selecting the guard period from a set of predefined guard period configurations based on the obtained timing advance and the radio access capability of the user equipment.

15. A computer program product comprising a non-transitory computer readable medium storing computer program code which, when executed by a processor comprised of a user equipment, causes the processor of the user equipment wireless device to perform operations comprising:

configuring a guard period in Half Duplex Frequency Division Duplex (HD-FDD) operation;
detecting a timing advance between the user equipment and an access point has changed by a value that is larger than a predetermined non-zero value; and
responsive to detecting the timing advance has changed by a value that is larger than the predetermined non-zero value, determining the guard period in the user equipment based on an amount of the detected change in the timing advance and a radio access capability of the user equipment.

16. A user equipment comprising:
a radio communication interface;
processing circuitry configured to cause the user equipment to perform operations comprising:
configuring a guard period in Half Duplex Frequency Division Duplex (HD-FDD) operation;
detecting a timing advance between the user equipment and an access point has changed by a value that is larger than a predetermined non-zero value; and
responsive to detecting the timing advance has changed by a value that is larger than the predetermined non-zero value, determining the guard period in the user equipment based on an amount of the detected change in the timing advance and a radio access capability of the user equipment.

17. The user equipment of claim 16, wherein the guard period is derived using a default timing advance.

18. The user equipment of claim 16, wherein the user equipment reports the radio access capability to the access point.

* * * * *